Figure 1:
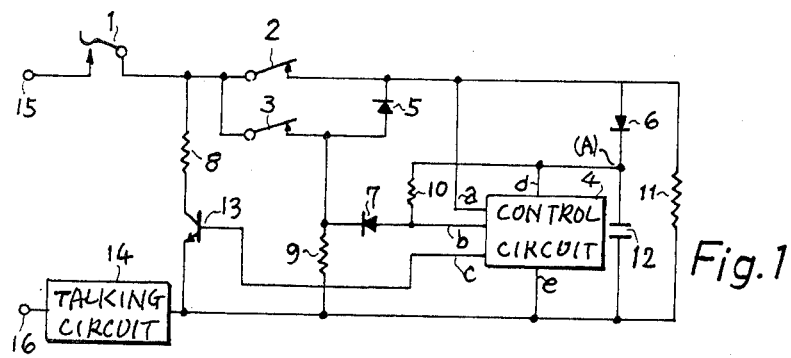

United States Patent [19]

Sekiguchi et al.

[11] 3,976,846

[45] Aug. 24, 1976

[54] DIAL DEVICE FOR A TELEPHONE SET HAVING A FUNCTION OF PREVENTING TOLL DIALING

[76] Inventors: Kouichi Sekiguchi, 2-17-2, Saiwai-cho, Asaka, Saitama; Akihiro Kobayashi, 4-35-1, Tanmachi, Kanagawa, Yokohama, Kanagawa, both of Japan

[22] Filed: July 3, 1974

[21] Appl. No.: 485,624

[30] Foreign Application Priority Data

July 6, 1973 Japan .............................. 48-76331
July 9, 1973 Japan .............................. 48-76557

[52] U.S. Cl. ............................................. 179/18 DA
[51] Int. Cl.² ........................................... H04M 1/66
[58] Field of Search ............................ 179/18 AL

[56] References Cited
UNITED STATES PATENTS

| 3,798,381 | 3/1974 | Piacente | 179/18 DA |
| 3,851,109 | 11/1974 | Downs | 179/18 DA |

Primary Examiner—William C. Cooper

[57] ABSTRACT

A dial device for a telephone set having a function of preventing toll dialing, in which a resistor or a zener diode is connected in series to a dial impulse contact of the dial device while a series connection of a first diode and a control circuit is connected in parallel with the resistor or the zener diode. A series-connection of a minimum pause contact and a second diode is connected in parallel with the dial impulse contact. An AND output of a dial impulse signal and a minimum pause signal from the minimum pause contact is obtained from a junction between the dial impulse contact and the first diode to apply it to a first input terminal of the control circuit, while the minimum pause signal is obtained from a junction between the minimum pause contact and the second diode to apply it to a second input terminal of the control circuit. A semiconductor switching element is connected in shunt with the dial impulse contact to prevent the sending-out of dialled impulses in response to the output of the control circuit when the dial impulse signal is a series of numbers representative of the toll dialling starting from a number 0 or numbers 10.

6 Claims, 5 Drawing Figures

DIAL DEVICE FOR A TELEPHONE SET HAVING A FUNCTION OF PREVENTING TOLL DIALING

This invention relates to a dial device for a telephone set having a function of preventing toll dialling.

Conventional dial devices of the type, having a counter for counting the number of dialled pulses require an impulse contact for counting the number of pulses corresponding to a dialled number and, to obtain a signal of a control device, a contact (called a minimum pause contact) associated with the dial device in a usual manner for deciding whether the dial is in its forward rotation state or in its release state, so that impulse transmission by the dial impulse contact is impossible unlike in ordinary telephones. Accordingly, use is made of the impulse relay system by a relay or by a switching transistor for dial impulse transmission. This introduces defects such as complexity in circuit construction, a change in the dial make ratio and impossibility of dialing when the pulse relay circuit is in fault.

An object of this invention is to provide a dial device for a telephone set having a function of preventing toll dialling, which is adapted to send out a dial impulse with a dial impulse contact and, at the same time, to obtain a dial impulse signal and a minimum pause signal necessary for a control circuit.

Figure 2:
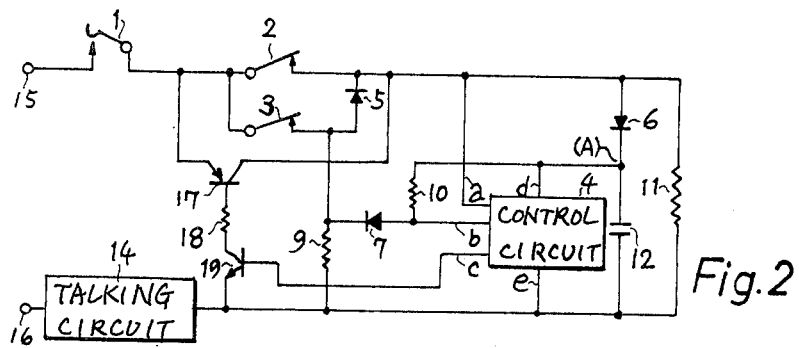
Figure 3:
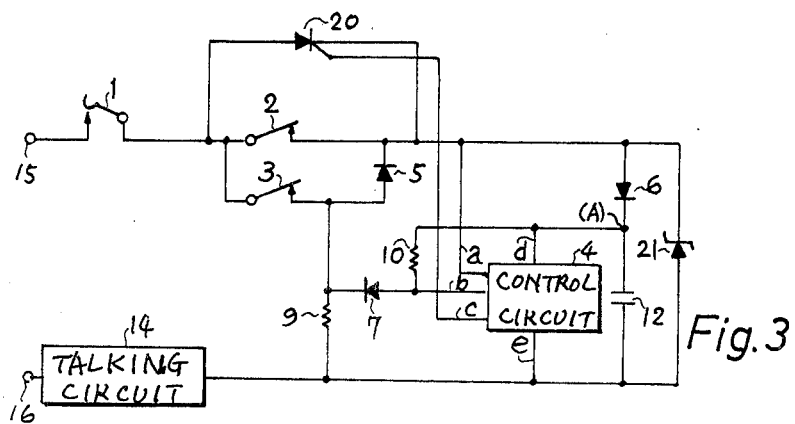
Figure 4:
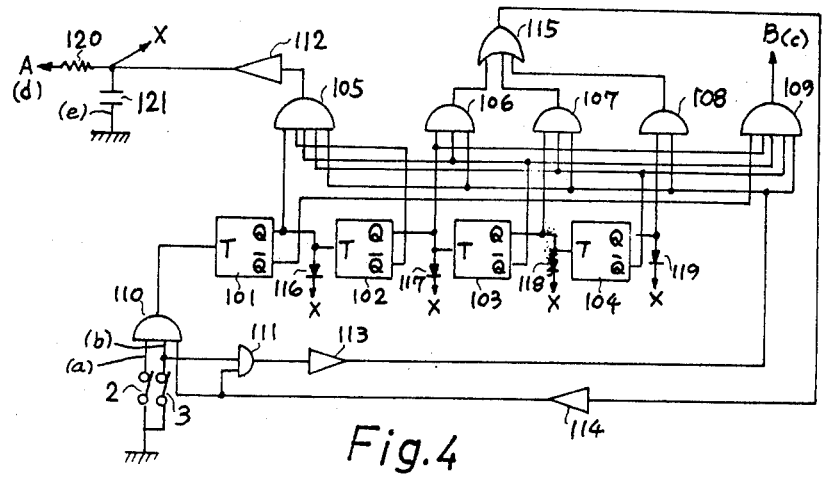
Figure 5:
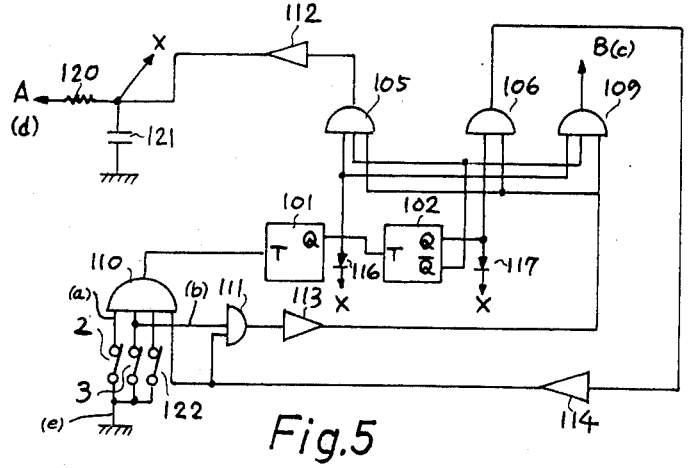

The principle, construction, and operations of this invention will be clearly understood from the following detailed description taken in conjunction with the accompanying drawings, in which:

FIGS. 1, 2 and 3 are circuit diagrams each illustrating an example of this invention; and FIGS. 4 and 5 are circuit diagrams each illustrating an example of a control circuit employed in the examples shown in FIGS. 1, 2 and 3.

With reference to FIG. 1, an example of this invention will be described. In FIG. 1, a reference numeral 1 designates a hook switch; 2 indicates a dial impulse contact; 3 denotes a contact called a minimum pause contact; 4 identifies a control circuit; 5, 6 and 7 represent diodes; 8, 9, 10 and 11 show fixed resistors, 12 refers to a capacitor; 13 indicates a transistor; 14 designates a talking circuit; and 15 and 16 represent line terminals. In the control circuit 4, a reference character $a$ denotes a dial impulse signal terminal; $b$ indicates a minimum pause signal terminal for applying thereto a minimum pause signal from the minimum pause contact; $c$ identifies a dialing preventive output terminal; and $d$ and $e$ show power source terminals of the control circuit 4. The line terminals 15 and 16 are respectively connected to the plus side and the minus side of a pair of telephone lines. The contacts 2 and 3 are associated with the rotary shaft of the dial device in a usual manner by the use of contact carrying springs, an operator, etc. (not shown).

When the handset of an associated telephone set is taken up, the hook switch 1 is turned-ON and a direct current flows through the hook switch 1, the dial impulse contact 2, the resistor 11 and the talking circuit 14 and, at the same time, through the hook switch 1, the minimum pause contact 3, the resistor 9 and the talking circuit 14. Under this condition, the current flows in the resistor 11 and, at the same time, is supplied through the diode 6 to the elements 4, 10 and 12 connected thereto. The capacitor 12 is provided to supply a current to the control circuit 4 and the resistor 10 when the dial impulse contact 2 is in its OFF-state.

Now, a description will be given of the manner of obtaining the dial impulse signal. The dial impulse signal is generated when the dial impulse contact 2 and the minimum pause contact 3 are both in their OFF-states. At this time, since the dial impulse contact 2 and the minimum pause contact 3 are both in their OFF-states, no voltage is produced across the resistor 11 so that the voltage at the terminal $a$ of the control circuit 4 is at a low level (hereinafter referred as a L-level). In a case where either one or both of the dial impulse contact 2 and the minimum pause contact 3 are in their ON-states, the voltage at the terminal $a$ of the control circuit 4 is equal to that across the resistor 11 and at a high level (hereinafter referred to as an H-level). Consequently, in the cases of forward rotation and release of the dial, pulses equal in number to the logical product of the dial impulse contact 2 and the minimum pause contact 3, that is, pulses being sent out, are applied to the terminal $a$ of the control circuit 4.

Next, a description will be made of the manner of obtaining the minimum pause signal. In a case where the dial is in its stand-still condition, the minimum pause contact 3 is in its ON-state so that a voltage equal to that across the resistor 11 is produced across the resistor 9 by the current flowing through the hook switch 1, the minimum pause contact 3, the resistor 9 and the talking circuit 14. As a result of this, the diode 7 is in its OFF-state so that the voltage at the terminal $b$ of the control circuit 4 is at the H-level. During the forward rotation or release of the dial, the minimum pause contact 3 is in its OFF-state, so that a current flows through the diode 6, the resistor 10, the diode 7 and the resistor 9. If the value of the resistor 9 is determined to be sufficiently lower than that of the resistor 10, the voltage at the terminal $b$ of the control circuit 4 is at the L-level. The diode 5 is provided to prevent a current flowing to the resistor 9 through the dial impulse contact 2 when the minimum pause contact 3 is in its OFF-state and the dial impulse contact 2 is in its ON-state. In the manner described above, the minimum pause signal of the minimum pause contact 3 is obtained at the terminal $b$ of the control circuit 4.

The control circuit 4 is a circuit which is adapted such that, (1) in the case of dialling a predetermined toll dialling numeral or numerals such, for example, as 0 for first dial rotation or 1 and 0 for first and second dial rotations, respectively, the number of dial impulses is counted and (2) the first and second dial rotations are decided by the minimum pause signal, whereby the voltage at the output terminal $c$ is changed from its initial L level to the H-level. If, now, the handset is taken up, the voltage at the dialling preventive output terminal $c$ is in its initial state, i.e. at the L-level, and the transistor 13 is in its OFF-state so that dial impulse transmission is possible. At this time, if the toll dialling is performed for a toll dialling number 0 or numbers 10 etc, the voltage of the output terminal $c$ becomes the H level, so that the transistor 13 is put in its ON-state to permit a current to flow through the hook switch 1, the resistor 8, the transistor 13 and the talking circuit 14. Therefore, even if the dial impulse contact 2 and the minimum pause contact 3 are turned OFF by the dialing operation, the current flowing across the line terminals 15 and 16 is maintained by the current flowing in the aforesaid transistor 13, thereby to prevent impulse transmission.

FIG. 2 shows another example of this invention. In FIG. 2, a reference numeral 17 indicates a transistor; 18 designates a fixed resistor; and 19 identifies a transistor. The difference between this example and the example of FIG. 1 is only a circuit for preventing the send-out of the dial impulses. Accordingly, this current will hereinafter be described. Under the initial condition, the voltage at the dialling preventive output terminal c of the control circuit 4 is at the L level, so that the transistor 19 is turned OFF and the transistor 17 is turned OFF, making it possible to send out the dial impulse. If the toll dialling is performed for dial numeral 0 or numerals 10, the output at the dialling preventive output terminal c of the control circuit 4 becomes the H level so that the transistor 19 is turned ON to flow a base current to the transistor 17 through the resistor 18 to turn ON the transistor 17. Accordingly, a dial impulse circuit is short-circuited, thereby preventing the send-out of the dial impulses.

FIG. 3 illustrates still another example of this invention. In FIG. 3, a reference numeral 20 designates a silicon controlled rectifier element (hereinafter referred as an SCR) and 21 identifies a constant-voltage diode or an ordinary diode. The difference between this example and the example shown in FIG. 1 will be described. The constant-voltage diode 21 performs the same function as that of the resistor 11 shown in FIG. 1 so that the voltage across the constant-voltage diode 21 is supplied through the diode 6 to the control circuit 4 and the resistor 10. Under the initial condition, the output at the toll dialling preventive output terminal c of the control circuit 4 is at the L level, so that the SCR 20 is in its OFF-state and it is possible to send out the dial impulses. Now, if the toll dialling is performed for a dial number 0 or numbers 10, the output at the output terminal c of the control circuit 4 becomes the H-level so that a trigger voltage is applied to the SCR 20 to turn ON the SCR 20. Accordingly, the dial impulse contact circuit is short-circuited, thereby preventing the send-out of the dialled impulses.

With reference to FIG. 4, an example of the control circuit 4 will be described. In FIG. 4, a reference numerals 101, 102, 103 and 104 indicate trigger flip-flops (hereinafter referred as TFF); 105, 106, 107, 108, 109, 110 and 111 designate AND gates; 112, 113 and 114 identify inverters; 115 represents an OR gate; 116, 117, 118 and 119 denote diodes; 120 shows a fixed resistor; 121 refers to a capacitor; 2 indicates the dial impulse contact; and 3 designates the minimum pause contact. The reference characters a–e indicate the terminals of the control circuit 4 respectively identified with the same reference characters a–e in FIGS. 1, 2 and 3. The arrow A is connected to the plus side of a control circuit power source and the arrow B is connected to the terminal c as shown in FIGS. 1 to 3 for preventing toll dialling by the output of the AND gate 9.

Under the initial condition where the power is supplied to the circuit shown in FIG. 4, the voltages at terminals Q of the TFF's 101, 102, 103 and 104, to which diodes 116, 117, 118 and 119 are connected, are set at a L level by the diodes 116, 117, 118 and 119, the resistor 120 and the capacitor 121. Upon forward rotation of the dial in such a state, the voltages at the dial impulse contact 2 and the minimum pause contact 3 and the output of the inverter 114 are at an H level, so that a corresponding number of pulses to the dialled number is obtained at the output terminal of the AND gate 110, that is, an input terminal T of the TFF 101 and counted by a counter composed of the TFF's 101 to 104. During the release period of the dial, the minimum pause contact 3 is in its OFF state and the output of the inverter 114 is at the H level, so that the output of the AND gate 111 becomes the H level and the output of the inverter 113 becomes the L level. When the output of the inverter 113 becomes the L level, the AND gates 105 to 109 are all closed to prevent sending-out of their outputs of the AND gates 105 to 109 during the counting.

1. In case of a first dialling number 2 or 3:

Upon dialling the number 2 or 3 by the first dialling, two or three pulses are applied to the counter and the output of the AND gate 106 becomes the H level. This output is applied to the inverter 114 through the OR gate 115 and the output of the inverter 114 becomes the L level to close the AND gate 110, thus preventing subsequent counting. Further, the output of the inverter 114 closes the AND gate 111, so that the output of the inverter 113 becomes the H level to prevent that the output of the inverter 113 is lowered by the second dialling to the L level.

2. In case of the first dialling number 4, 5, 6 or 7:

Upon dialling one of the numbers 4 to 7 by first dialling, four to seven pulses are applied to the counter so that the output of the AND gate 107 becomes the H level and the output of the AND gate 107 is applied to the OR gate 115. The subsequent operation is the same as that in the case of the first dialling 2 or 3.

3. In case of a first dialling number 8 or 9:

Upon dialling the number 8 or 9 by first dialling, eight or nine pulses are applied to the counter so that the output of the AND gate 108 becomes the H level and this output is applied to the OR gate 115. The subsequent operation is the same as that in the case (1) of the first dialling number 2 or 3.

4. In case of a first dialling number 0:

Upon dialling the number 0 by first dialling, ten pulses are applied to the counter and the output of the AND gate 108 becomes the level H. This output is applied through the OR gate 115 and the inverter 114 to the AND gate 110 to close it to prevent subsequent counting and, at the same time, to close the AND gate 111 to hold the output of the inverter 113 at the H level. Further, in this case, the inputs to the AND gate 109 are all 1, so that the output thereof becomes the H level, by which effective dialling can be prevented.

5. In case of a first dialling number 1:

Upon dialling the number 1 by first dialling, one pulse is applied to the counter and the output of the AND gate 105 becomes the H level. The output of the AND gate 105 is applied through the inverter 112 to a terminal X to lower the voltage at this terminal x to the L level and, by the functions of the capacitors 121, the resistor 120 and the diodes 116 to 119 connected to the terminal X, the TFF's 101 to 104 are reset at their initial states. Consequently, counting of the second dialling number is possible only in the case of the first dialling number 1.

The operation of the counter by the second dialling number is exactly the same as that in the case of the first dialling number.

As understood from the above operation, in the cases of the first dialling number 0 and the first and second finger dialling numbers 1 and 0, the output of the AND gate 109 becomes the H level, by which subsequent effective dialling is prevented.

FIG. 5 illustrates another example of the control circuit 4. In the circuit of FIG. 5, a classification contact 122, as disclosed in the present inventors' copending U.S. Patent Application Ser. No: 437,784 filed on January 30, 1974, is added to the circuit shown in FIG. 4 and the logical product of the dial impulse contact 2, the minimum pause contact 3 and the classification contact 122 is obtained, by which one, two and three pulses are applied to the counter in cases of the dialling number 1, one of 2 to 9 and 0, respectively, thus simplifying the counter circuit. In the initial condition where the power is supplied to the circuit of FIG. 5, the voltages at the terminals Q of the TFF's 101 and 102 are set at the L level by the action of the capacitor 121 and the diodes 116 and 117. Next, the operation of the circuit will be described with regard to the cases of respective dialling numbers.

1. In case of the first dialling number 2, 3, 4, . . . or 9:

When dialling is performed for one of dialling numbers 2 to 9 dialled by the first dialling, the output of the inverter 114 is at the H level, so that two pulses are applied to the counter. Accordingly, the output of the AND gate 106 becomes the H level, and the output of the inverter 114 becomes the L level. In response to the lowering of the output of the inverter 114 to the L level, the AND gates 110 and 111 are closed to prevent the counting on and after the second dialling and, at the same time, to retain the output of the inverter 113 at the H level regardless of the position of the contact of the minimum pause contact 2.

2. In case of the first dialling number 0:

When the dialling number 0 is dialled by the first dialling, three pulses are applied to the counter so that the output of the AND gate 106 becomes the H level to provide the same operation as that in the case of the first dialling number 2, 3, 4, . . . or 9. At the same time, the output of the AND gate 109 becomes the H level so that sending-out of the dialled pulses is prevented by this output B.

Upon dialling the dialling number 1 by the first dialling, one pulse is applied to the counter so that the output of the AND gate 105 becomes the H level. In response to this output, the output of the inverter 112 becomes the L level and the TFF's 101 and 102 are reset at their initial states by the capacitor 121 and the diodes 116 and 117 connected to the terminal X. Consequently, in the case of the first dialling number 1, the circuit is returned to its initial condition, so that counting for the second dialling number is possible. The operation of the circuit for each second dialling number is the same as that in the case of the first dialling.

As understood from the above operation, in the cases of the first dialling number 0 and the first and second dialling numbers 1 and 0, the output of the AND gate 109 becomes the H level so that subsequent dialling can be prevented by this output.

As has been described in the foregoing, in the present invention, the impulses are sent out by the use of the dial impulse contact and, at the same time, the dial impulse signal and the minimum pause signal necessary for control can be applied to the control circuit, so that no pulse relay circuit is required, which leads to simplification of the circuit construction and enhancement of reliability.

What we claim is:

1. A dial device for a telephone set for preventing toll dialling, comprising:

a pair of line terminals;

a first series-circuit comprised of a hook switch, a dial impulse contact, a load capable of passing direct current and a talking circuit, the first series-circuit being connected to said line terminals;

a second series-circuit comprised of a control circuit having input and output terminals and a first diode in series with the output terminals, the second series-circuit being connected in parallel with the load;

a third series-circuit comprised of a minimum pause contact and a second diode, the third series-circuit being connected in parallel with said dial impulse contact;

means for connecting a first input terminal of said control circuit to a first junction between said dial impulse contact and said first diode to apply in use the logical AND combination of a dial impulse signal and a minimum pause signal to said first input terminal;

means for connecting a second input terminal of the control circuit to a second junction between said minimum pause contact and said second diode to apply a minimum pause signal to said second input terminal; and semiconductor switching means connected in parallel with said dial impulse contact for preventing the transmission of dialled impulses across said line terminals in response to the output of said control circuit when said dial impulse signal is a series of numbers representative of the toll dialling starting from a number 0 or numbers 10.

2. A dial device according to claim 1, in which said control circuit comprises a counter, reset means connected to the counter for resetting the counting state of the counter when the output state of the counter indicates a first special number, such as 1, first inhibit means connected to said first and second input terminals and said counter for inhibiting input pulses to said counter when the output state of the counter indicates one of other numbers, and second inhibit means connected to said counter for providing an output at said output terminal to prevent the sending-out of dialled impulses when said one of other numbers is a second special number, such as 0.

3. A dial device according to claim 1, in which said semiconductor switching means is connected in parallel with a series connection of said dial impulse contact and said load means.

4. A dial device according to claim 1, in which said semiconductor switching means is connected in parallel with said dial impulse contact.

5. A dial device according to claim 1, in which said load means is a diode.

6. A dial device according to claim 5, in which said diode is a constant-voltage diode.

* * * * *